United States Patent
Kim et al.

(10) Patent No.: US 11,621,569 B2
(45) Date of Patent: Apr. 4, 2023

(54) ELECTRONIC DEVICE AND CONTROL METHOD FOR DETERMINING POWER TRANSMISSION PATH AT LEAST ON BASIS OF ATTRIBUTE OF POWER SUPPLIED FROM OUTSIDE OF ELECTRONIC DEVICE AND STATE OF ELECTRONIC DEVICE

(71) Applicant: Samsung Electronics Co., Ltd., Suwon-si (KR)

(72) Inventors: Gibae Kim, Suwon-si (KR); Jooyoung Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 17/040,822

(22) PCT Filed: Mar. 20, 2019

(86) PCT No.: PCT/KR2019/003241
§ 371 (c)(1),
(2) Date: Sep. 23, 2020

(87) PCT Pub. No.: WO2019/182350
PCT Pub. Date: Sep. 26, 2019

(65) Prior Publication Data
US 2021/0036525 A1 Feb. 4, 2021

(30) Foreign Application Priority Data

Mar. 23, 2018 (KR) .......... 10-2018-0034035

(51) Int. Cl.
*H02J 7/00* (2006.01)
*H02J 50/90* (2016.01)
*H01M 10/48* (2006.01)

(52) U.S. Cl.
CPC ......... *H02J 7/00036* (2020.01); *H01M 10/48* (2013.01); *H02J 50/90* (2016.02)

(58) Field of Classification Search
USPC ................. 310/106, 107, 108, 109, 110, 130
See application file for complete search history.

(56) References Cited

U.S. PATENT DOCUMENTS

| 5,193,054 A | 3/1993 | Galloway et al. |
| 2002/0140400 A1 * | 10/2002 | Hatori ................... H02J 3/0075 320/130 |

(Continued)

FOREIGN PATENT DOCUMENTS

| CA | 2987096 A1 * | 6/2018 | .............. B60L 53/00 |
| CN | 104078716 A * | 10/2014 | .......... H01M 10/446 |

(Continued)

OTHER PUBLICATIONS

International Search Report and Written Opinion of the International Searching Authority in connection with International Application No. PCT/KR2019/003241 dated Jun. 24, 2019, 17 pages.

(Continued)

*Primary Examiner* — Brian Ngo

(57) ABSTRACT

Provided are an electronic device and a control method for determining a power acquisition path at least on the basis of an attribute of power supplied from the outside of the electronic device and a state of the electronic device. An electronic device according to various embodiments of the present disclosure may comprise: a battery; a charging circuit connected to the battery through a first path; and a processor operably connected to the charging circuit through a second path, wherein the processor is configured to: acquire first power for charging the battery from the outside of the electronic device by using the charging circuit; acquire second power required to perform at least one operation of the processor through the first path and the (Continued)

second path; and when the correlation between the first power and the second power satisfies a designated condition, acquire the second power though a third path through which the battery and the processor are connected by a switching circuit disposed between the first path and the second path.

14 Claims, 16 Drawing Sheets

(56)     References Cited

U.S. PATENT DOCUMENTS

| | | |
|---|---|---|
| 2016/0211691 A1 | 7/2016 | Chen et al. |
| 2017/0255567 A1 | 9/2017 | Vidyadhara et al. |
| 2017/0256192 A1 | 9/2017 | Knepper et al. |
| 2017/0256953 A1 | 9/2017 | Nishimura |
| 2017/0257920 A1 | 9/2017 | Liu |
| 2018/0226816 A1 | 8/2018 | Na et al. |
| 2019/0131810 A1* | 5/2019 | Lim .................. H02J 7/342 |

FOREIGN PATENT DOCUMENTS

| | | |
|---|---|---|
| JP | 2000-287375 A | 10/2000 |
| JP | 2014-107910 A | 6/2014 |
| KR | 10-2007-0105219 A | 10/2007 |
| KR | 10-2017-0022449 A | 3/2017 |

OTHER PUBLICATIONS

Office Action dated Jan. 3, 2023, in connection with Korean Patent Application No. 10-2018-0034035, 13 pages.

* cited by examiner

ELECTRONIC DEVICE AND CONTROL METHOD FOR DETERMINING POWER TRANSMISSION PATH AT LEAST ON BASIS OF ATTRIBUTE OF POWER SUPPLIED FROM OUTSIDE OF ELECTRONIC DEVICE AND STATE OF ELECTRONIC DEVICE

CROSS-REFERENCE TO RELATED APPLICATIONS

This application is a National Phase Entry of PCT international Application No. PCT/KR2019/003241, which was filed on Mar. 20, 2019, and claims priority to Korean Patent Application No. 10-2018-0034035 filed on Mar. 23, 2018, in the Korean Intellectual Property Office, the contents of which are incorporated herein by reference.

BACKGROUND

1. Field

The present disclosure relates to an electronic device that determines a power transmission path at least based on an attribute of a power supplied from the outside of the electronic device and a state of the electronic device and a control method for the electronic device.

2. Description of Related Art

Various services and additional functions provided by electronic devices, e.g., portable electronic devices such as smartphones have been gradually diversified. To improve the utility value of electronic devices and meet various demands of users, communication service providers or electronic device manufacturers have competitively developed electronic devices to provide various functions and to differentiate their electronic devices from electronic devices of other companies. As a result, various functions provided through electronic devices have gradually become sophisticated.

With the sophistication of functions offered in electronic devices (e.g., smartphones), parts for providing the sophisticated functions have become high-performance components. The high-performance components may increase total power consumption of the electronic device (e.g., battery power consumption). However, due to "portability" of the electronic device, there is a limitation in the size (e.g., the capacity) of a battery that may be included in the electronic device. Users of the electronic device desire to be provided with a sophisticated function through the electronic device and to secure an as long use time of the electronic device (a duration in which a portable electronic device maintains an on (ON) state) as possible.

SUMMARY

When a voltage state of a battery of an electronic device is a low-voltage state, a user may use the electronic device while charging the electronic device. For example, the user may charge the electronic device through connection (e.g., using a universal serial bus (USB) port) to an external electronic device (e.g., a laptop computer or a vehicle). However, when an external power source connected to charge the electronic device supplies low power (e.g., in case of misalignment between a vehicular USB or a wireless power transmitter and the electronic device, etc.), a supplied power volume (or electric current volume) supplied from the external power source may be smaller than a consumed power volume (or electric current volume) of the battery of the electronic device. This case may originate from high performance of the electronic device. When the supplied power volume is smaller than the consumed power volume, the electronic device may be turned off (OFF) at a particular point in time. Such unscheduled switching to the off state of the electronic device may cause a failure in satisfying users' demands for using the electronic device for an as long time as possible.

According to various embodiments of the present disclosure, there is provided an electronic device capable of preventing malfunction of the electronic device (e.g., turning-off of the electronic device) by determining an acquisition path (e.g., adding a path) of power supplied to a processor from a battery at least based on an attribute (e.g., low electric current power) of power supplied from the outside of the electronic device and a state of the electronic device (e.g., a battery voltage level of the electronic device or a consumed power volume of the processor of the electronic device).

An electronic device according to various embodiments of the present disclosure includes a battery, a charging circuitry connected to the battery through a first path, and a processor operatively connected to the charging circuitry through a second path, in which the processor is configured to acquire first power for charging the battery from the outside of the electronic device, by using the charging circuitry, to acquire second power required for performing at least one operation of the processor through the first path and the second path, and to acquire the second power though a third path through which the battery and the processor are connected by a switching circuit disposed between the first path and the second path, when a correlation between the first power and the second power satisfies a designated condition.

A control method for an electronic device according to various embodiments of the present disclosure includes acquiring first power for charging a battery from the outside of the electronic device by using a charging circuitry, acquiring second power required to perform at least one operation of a processor through a first path and a second path, and acquiring the second power though a third path through which the battery and the processor are connected by a switching circuit disposed between the first path and the second path, when a correlation between the first power and the second power satisfies a designated condition.

An electronic device according to various embodiments of the present disclosure includes a battery, a power management module, a charging circuitry, a switching circuit disposed between the battery and the power management module, and a processor operatively connected to the battery, the power management module, the switching circuit, and the charging circuitry, in which the processor is configured to determine connection of an external electronic device to the electronic device, to determine whether the external electronic device, the connection of which is determined, is an electronic device for power supply, to identify a voltage of the battery and a strength of current supplied from the external electronic device, when the external electronic device is determined to be the electronic device for power supply, and to control the switching circuit to be shorted, when the voltage of the battery and the strength of the current supplied from the external electronic device satisfy a designated condition.

According to various embodiments of the present disclosure, by determining an acquisition path (e.g., a dual path)

of power supplied to a processor from a battery at least based on an attribute of power supplied from the outside of the electronic device and a state of the electronic device, stable voltage supply to the processor is possible, thus preventing malfunction of the electronic device.

Effects according to various embodiments are not limited to the described effects, and it would be obvious to those of ordinary skill in the art that various effects are included in the present disclosure.

DETAILED DESCRIPTION

Figure 1:
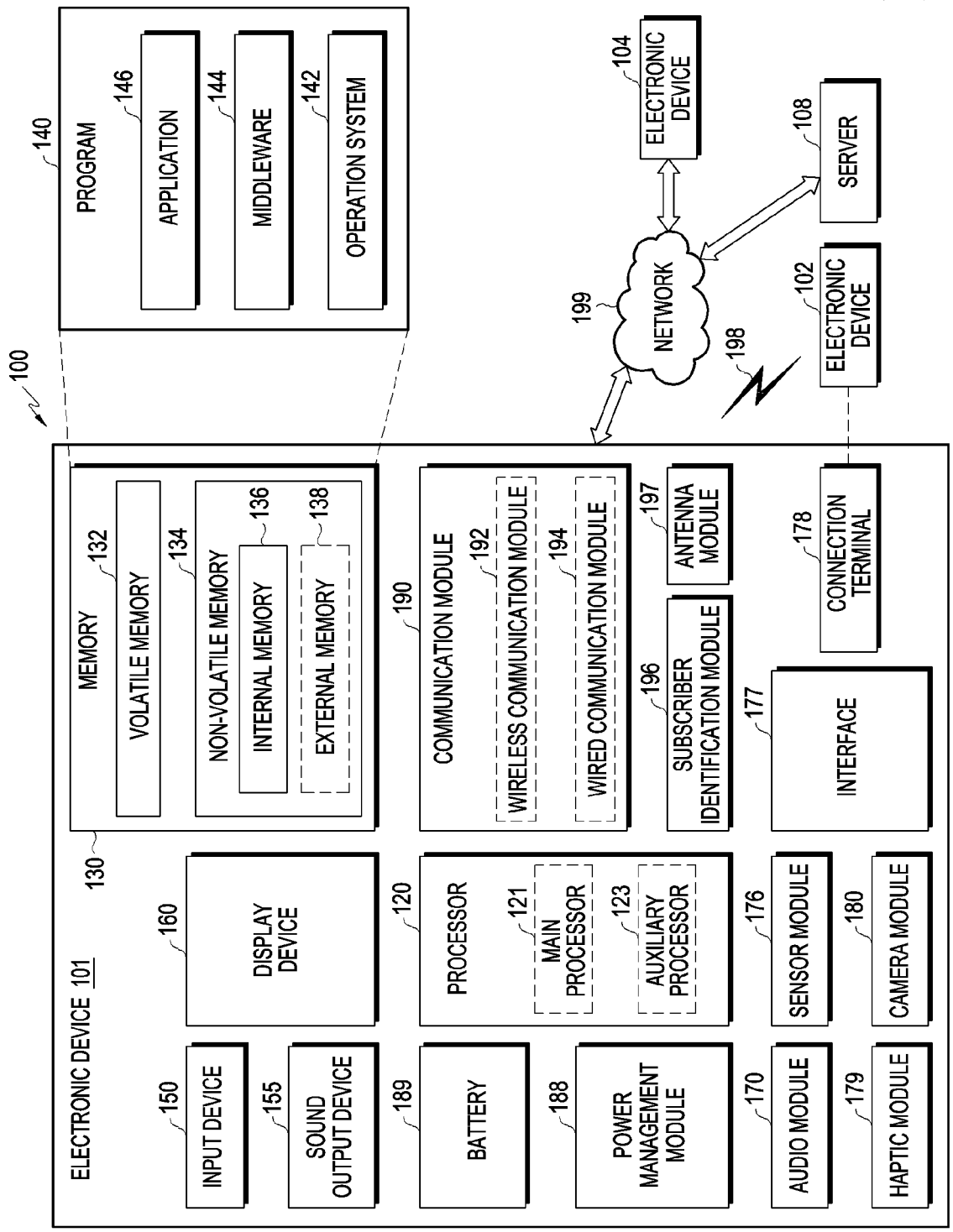
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as a single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
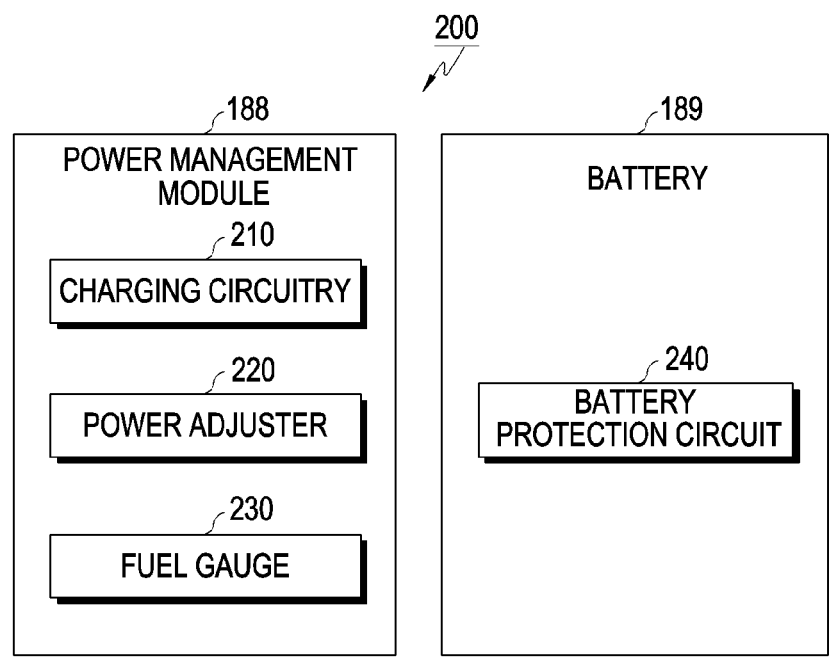
FIG. 2 is a block diagram of a power management module and a battery, according to various embodiments.

FIG. 2 is a block diagram 200 of the power management module 188 and the battery 189 according to various embodiments. Referring to FIG. 2, the power management module 188 may include a charging circuit or circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 276, the power gauge 230, or the power management module 188. According to an embodiment, the corresponding sensor (e.g., a temperature sensor) of the sensor module 176 may be included as part of the PCM 140, or may be disposed near the battery 189 as a separate device.

Figure 3A:
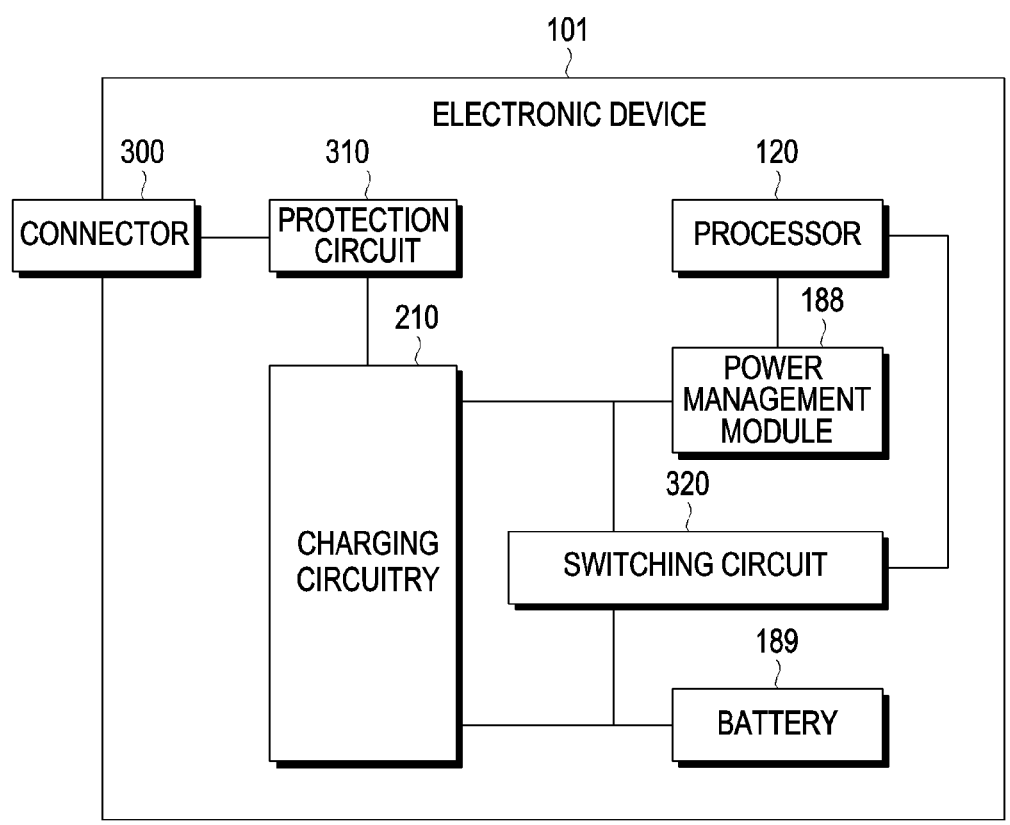
FIGS. 3A and 3B are diagrams for describing an electronic device, according to various embodiments.
Figure 3B:
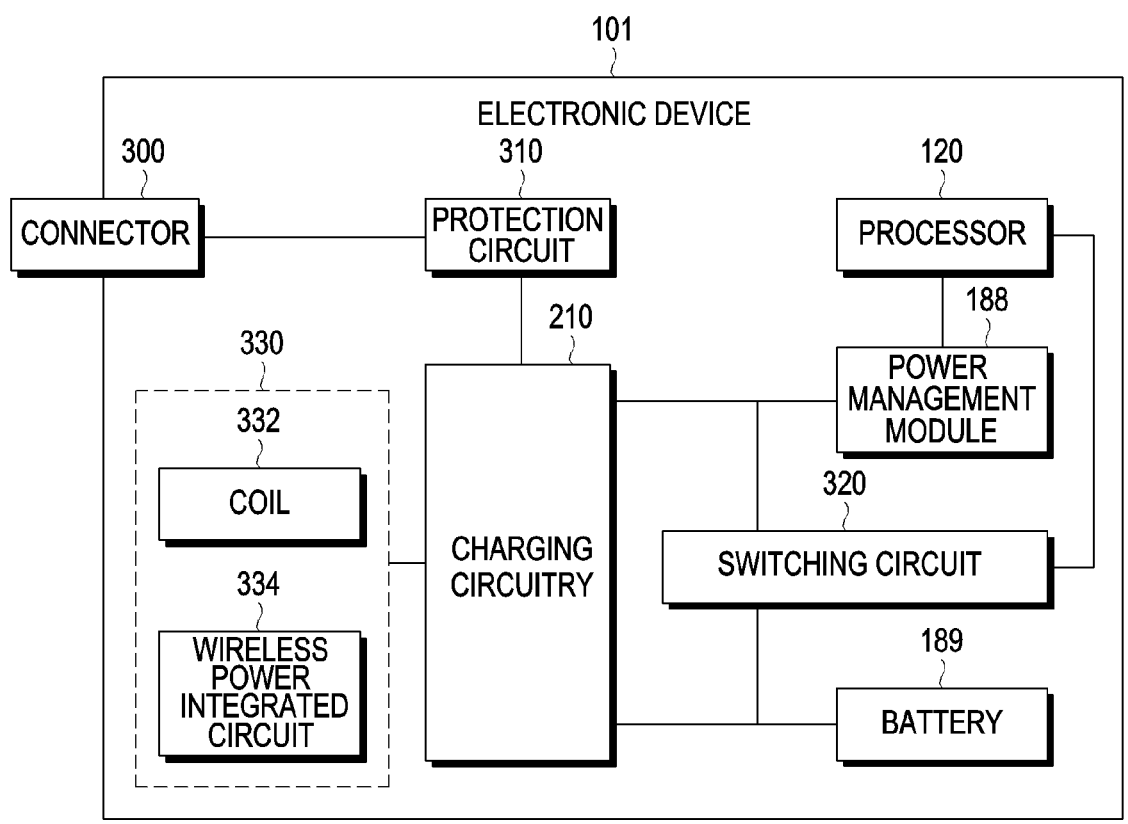

FIGS. 3A and 3B are diagrams for describing the electronic device 101, according to various embodiments. FIG. 3A illustrates the electronic device 101 that does not support wireless charging, and FIG. 3B illustrates the electronic device 101 that supports wireless charging.

Referring to FIG. 3A, the electronic device 101 according to various embodiments of the present disclosure may include the processor 120, the power management module 188, the battery 189, the charging circuitry 210, a connector 300, a protection circuit 310, and a switching circuit 320.

The processor 120 according to various embodiments of the present disclosure may be operatively connected to at least one component of the electronic device 101 (e.g., at least one of the power management module 188, the battery 189, the charging circuitry 210, the connector 300, the protecting circuit 310, or the switching circuit 320). The processor 120 according to various embodiments of the present disclosure may control various components of the electronic device 101 connected to the processor 120 and perform various data processing or computation, by executing, for example, software (e.g., the program 140 of FIG. 1). At least a part of a description of the processor 120 of FIG. 1 may be equally applied to the processor 120 of FIG. 3A.

The power management module 188 according to various embodiments of the present disclosure may be connected to the switching circuit 320. The power management module 188 according to various embodiments of the present disclosure may be implemented as at least a part of a PMIC. At least a part of a description of the processor 188 of FIG. 1 may be equally applied to the power management module 188 of FIG. 3A.

The battery 189 according to various embodiments of the present disclosure may be connected to the switching circuit 320. The battery 189 according to various embodiments of the present disclosure may provide power to the processor 120 and/or the power management module 188 via the switching circuit 320 without passing through the charging circuitry 210. At least a part of a description of the battery 189 of FIG. 1 may be equally applied to the processor 189 of FIG. 3A.

The charging circuitry 210 according to various embodiments of the present disclosure may be implemented separately from the power management module 188 (e.g., as different chips), as shown in FIG. 3A. However, the charging circuitry 210 according to various embodiments of the present disclosure may be implemented collectively with the power management module 188 (e.g., as one chip). At least a part of a description of the charging circuitry 210 of FIG. 2 may be equally applied to the charging circuitry 210 of FIG. 3A.

The connector 300 according to various embodiments of the present disclosure may include an interface (e.g., the interface 177 of FIG. 1). The connector 300 according to various embodiments of the present disclosure may be connected to the protection circuit 310. A terminal for wireless charging (e.g., a USB connector) may be inserted through the connector 300 according to various embodiments of the present disclosure.

The protection circuit 310 according to various embodiments of the present disclosure may perform one or more among various functions to prevent performance degradation or burning of the electronic device 101 (e.g., the charging circuitry 210). The protection circuit 310 according to various embodiments of the present disclosure may include an over voltage protection (OVP).

The switching circuit 320 according to various embodiments of the present disclosure may be disposed between the power management module 188 and the processor 120. The switching circuit 320 according to various embodiments of the present disclosure may be controlled (shorted or opened) by a control signal (e.g., a high signal or a low signal) generated by the processor 120. When the switching circuit 320 according to various embodiments of the present disclosure is shorted, a path (e.g., the third path) for connecting the processor 120, the power management module 188, the switching circuit 320, and the battery 189 may be generated. According to various embodiments of the present disclosure, a circuit (not shown) for bucking or boosting power (e.g., a voltage) output from the battery may be further included between the switching circuit 320 and the power management module 188.

Referring to FIG. 3B, the electronic device 101 according to various embodiments of the disclosure may further include a wireless power reception circuit 330. The wireless power reception circuit 330 according to various embodiments of the present disclosure may include a coil 332 and a wireless power integrated circuit 334.

The coil 332 according to various embodiments of the present disclosure may acquire charging power (or charging current or charging voltage) from a coil of a wireless power transmitter (not shown).

The wireless power integrated circuit 334 according to various embodiments of the present disclosure may rectify charging power received from the coil 332 and perform DC/DC conversion. The wireless power integrated circuit 334 according to various embodiments of the present disclosure may provide converted power to the charging circuitry 210. The charging circuitry 210 according to various embodiments of the present disclosure may charge the battery 189 by using power provided from the wireless power reception circuit 330 (e.g., the wireless power integrated circuit 334). The description made with reference to FIG. 3A may be equally applied to the processor 120, the power management module 188, the battery 189, the charging circuitry 210, the connector 300, the protection circuit 310, and the switching circuit 320 shown in FIG. 3B.

Figure 4:
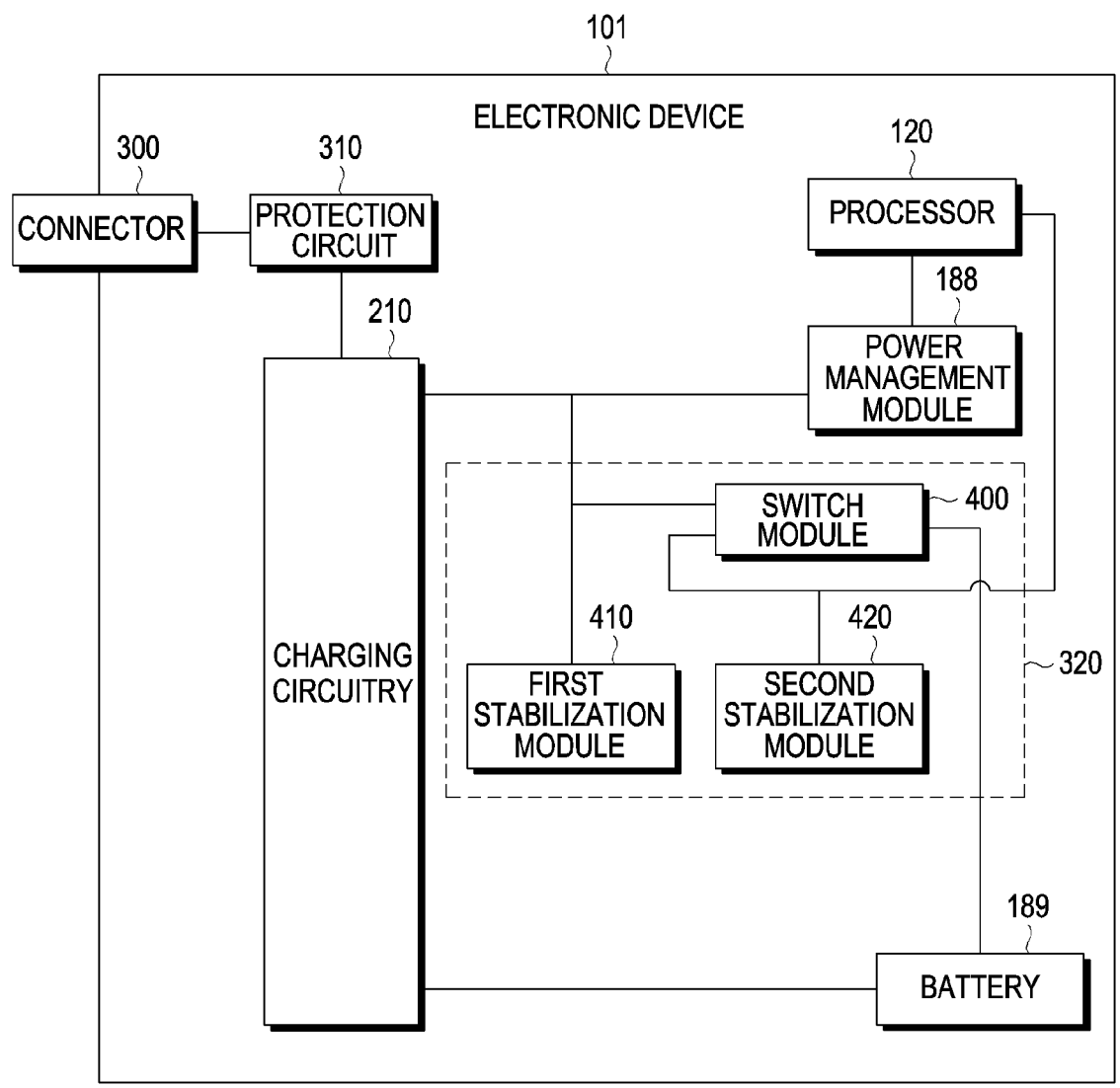
FIG. 4 is a diagram for describing a switching circuit according to various embodiments.
Figure 5:
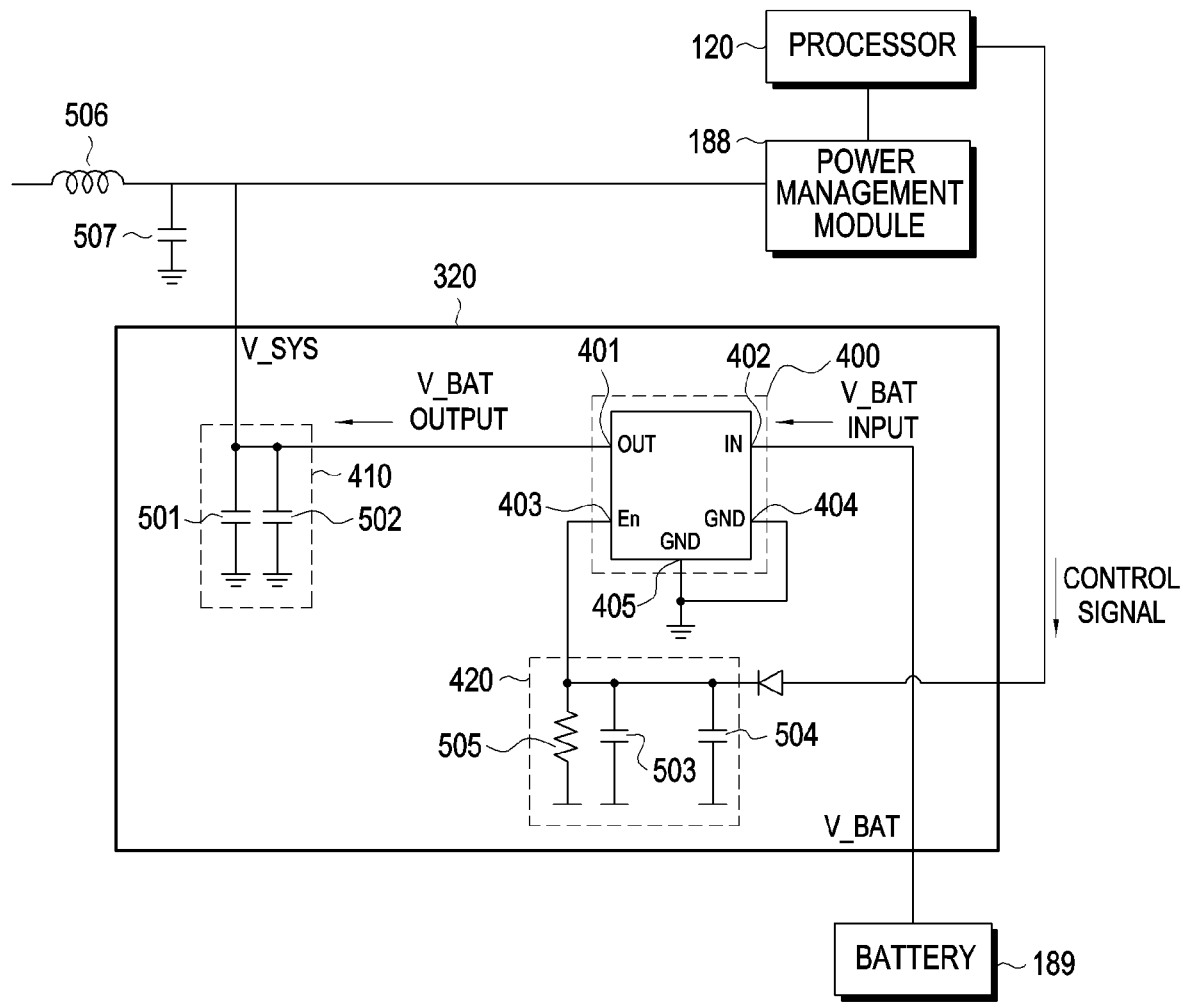
FIG. 5 is a circuit diagram of a switching circuit according to various embodiments.

FIG. 4 is a diagram for describing the switching circuit 320 according to various embodiments. FIG. 5 is a circuit diagram of the switching circuit 320 according to various embodiments.

The switching circuit 320 according to various embodiments of the present disclosure may include a switch module 400, a first stabilization module 410, and a second stabilization module 420.

The switch module 400 according to various embodiments of the present disclosure may include at least one switch (not shown) that is shorted or opened under control of the processor 120. The switch circuit 400 according to various embodiments of the present disclosure may be operatively connected to the first stabilization module 410 and the second stabilization module 420. The switch module 400 according to various embodiments of the present disclosure may include a first pin 401, a second pin 402, a third pin 403, a fourth pin 404, and a fifth pin 405.

The first pin 401 according to various embodiments of the present disclosure may be connected to the power management module 188 and the first stabilization module 410. The first pin 401 according to various embodiments of the present disclosure may be mentioned as the term "output pin". The processor 120 according to various embodiments of the present disclosure may control the switch module 400 to output power supplied from the battery 189 to the power management module 188 through the first pin 401, when a designated condition is satisfied. The first pin 401 according to various embodiments of the present disclosure may be connected to a terminal V-SYS of the switching circuit 320.

The second pin 402 according to various embodiments of the present disclosure may be connected to the battery 189. The second pin 402 according to various embodiments of the present disclosure may be connected to the battery 189 (e.g., a particular pin of a battery connector) through a terminal V_BAT of the switching circuit 320. When the switching circuit 320 according to various embodiments of the present disclosure is shorted, the power output from the battery 189 may be supplied to the switching circuit 320 through the terminal V_BAT. When the switching circuit 320 according to various embodiments of the present disclosure is shorted, the power output through the terminal V_BAT may be supplied to the power management module 188 through the terminal V_SYS of the switching circuit 320. The second pin 402 according to various embodiments of the present disclosure may be mentioned as the term "input pin".

The third pin 403 according to various embodiments of the present disclosure may be connected to the processor 120 and the second stabilization module 420. The processor 120 according to various embodiments of the present disclosure may control a control signal to the switching circuit 400 through the third pin 403. The control signal according to various embodiments of the present disclosure may include a high-level signal for shorting the switching circuit 320 (e.g., the switch module 400) and a low-level signal for opening the switching circuit 320 (e.g., the switch module 400). The switching circuit 320 according to various embodiments of the present disclosure may be connected through a general-purpose input/output port (GPIO) of the processor 120.

The fourth pin 404 and the fifth pin 405 according to various embodiments of the present disclosure may be grounded (GND).

The switch module 400 according to various embodiments of the present disclosure may further include various numbers of pins in addition to the first pin 401 through the fifth pin 405. Connection with other components through pins (e.g., the first pin 401 through the fourth pin 404) of the switch module 400 according to various embodiments of the present disclosure may change. According to various embodiments of the present disclosure, the term "pin" may be used alternatively/interchangeably with the term "port".

The first stabilization module 410 and the second stabilization module 420 according to various embodiments of the present disclosure may perform one or more of various functions (e.g., a voltage drop function) for preventing performance degradation or burning of the switching circuit 320 due to increase in a voltage or current of the switching circuit 320. The first stabilization module 410 according to various embodiments of the present disclosure may include at least one capacitor (e.g., a first capacitor 501 and a second capacitor 502). The second stabilization module 420 according to various embodiments of the present disclosure may include at least one capacitor (e.g., a third capacitor 503 and a fourth capacitor 504) and at least one resistor (e.g., a first resistor 505). However, various elements included in the first stabilization module 410 and the second stabilization module 420 according to various embodiments of the present disclosure have been described as an example, and may include various numbers of capacitors, inductors, resistors, or various elements.

The electronic device 101 according to various embodiments of the present disclosure may include a filter 506 and a grounded capacitor 507 between the charging circuitry 210 and the power management module 188. According to various embodiments of the present disclosure, the filter 506 and the grounded capacitor 507 may be omitted. The filter 506 according to various embodiments of the present disclosure may include an inductor. A capacity of the grounded capacitor 507 according to various embodiments of the present disclosure may be, but not limited to, 1 nanofarad (nF).

Figure 6A:
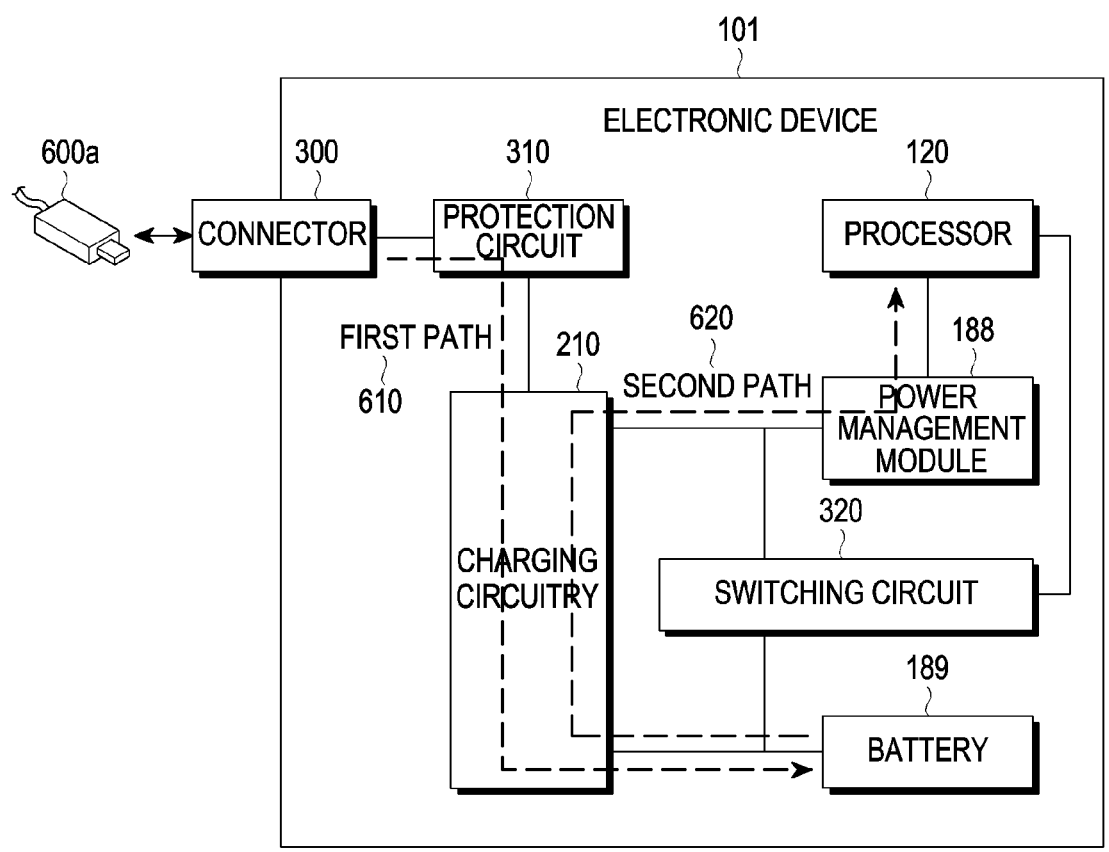
FIGS. 6A and 6B are diagrams for describing a first path and a second path according to various embodiments.
Figure 6B:
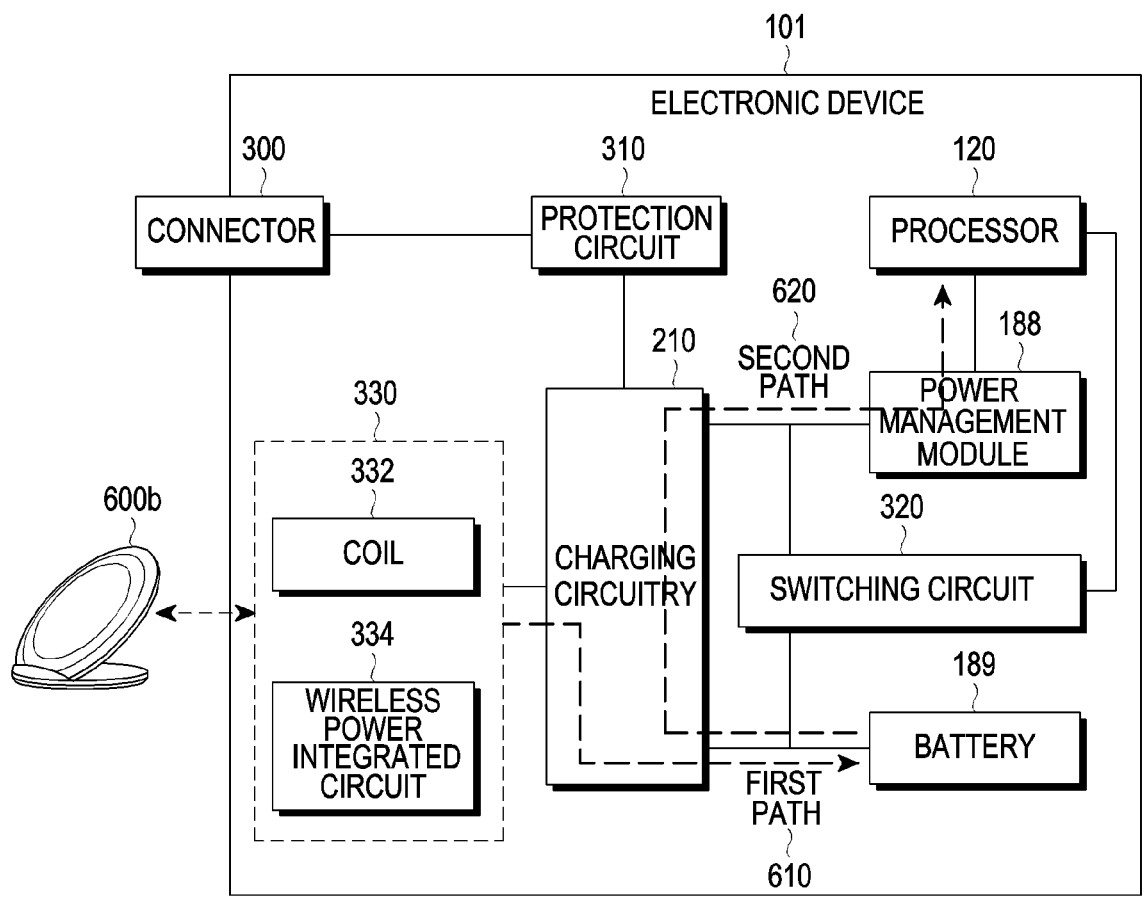

FIGS. 6A and 6B are diagrams for describing a first path 610 and a second path 620 according to various embodiments. The first path 610 mentioned herein may mean a path through which power is acquired from outside to charge the battery 189. The second path 620 mentioned herein may mean a path through which the charging circuitry 210 is supplied with power from the battery 189 to supply the power to the power management module 189 or the processor 120.

Referring to FIG. 6A, a wired charging terminal 600a may be inserted into the connector 300 according to various embodiments of the present disclosure. The processor 120 according to various embodiments of the present disclosure may detect (or identify) insertion of the wired charging terminal 600a. For wired charging, the first path 610 according to various embodiments of the present disclosure may include a path for connecting at least some of the connector 300, the protection circuit 310, the charging circuitry 210, or the battery 189.

Referring to FIG. 6B, for wireless charging, the first path 610 according to various embodiments of the present disclosure may include a path for connecting at least some of the wireless power reception circuit 330, the charging circuitry 210, or the battery 189. The electronic device 101 according to various embodiments of the present disclosure may be supplied with wireless power for driving the electronic device 101 from a wireless power supply device 600b.

Figure 7A:
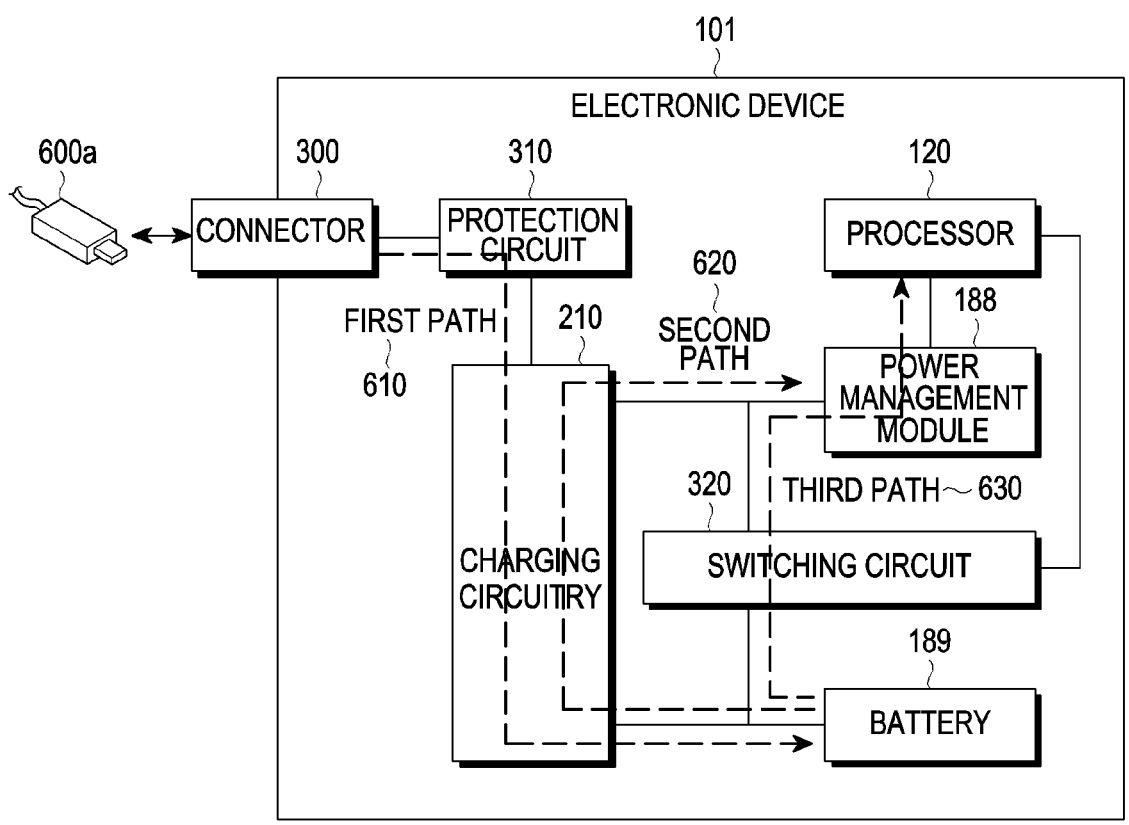
FIGS. 7A and 7B are diagrams for describing a third path according to various embodiments.
Figure 7B:
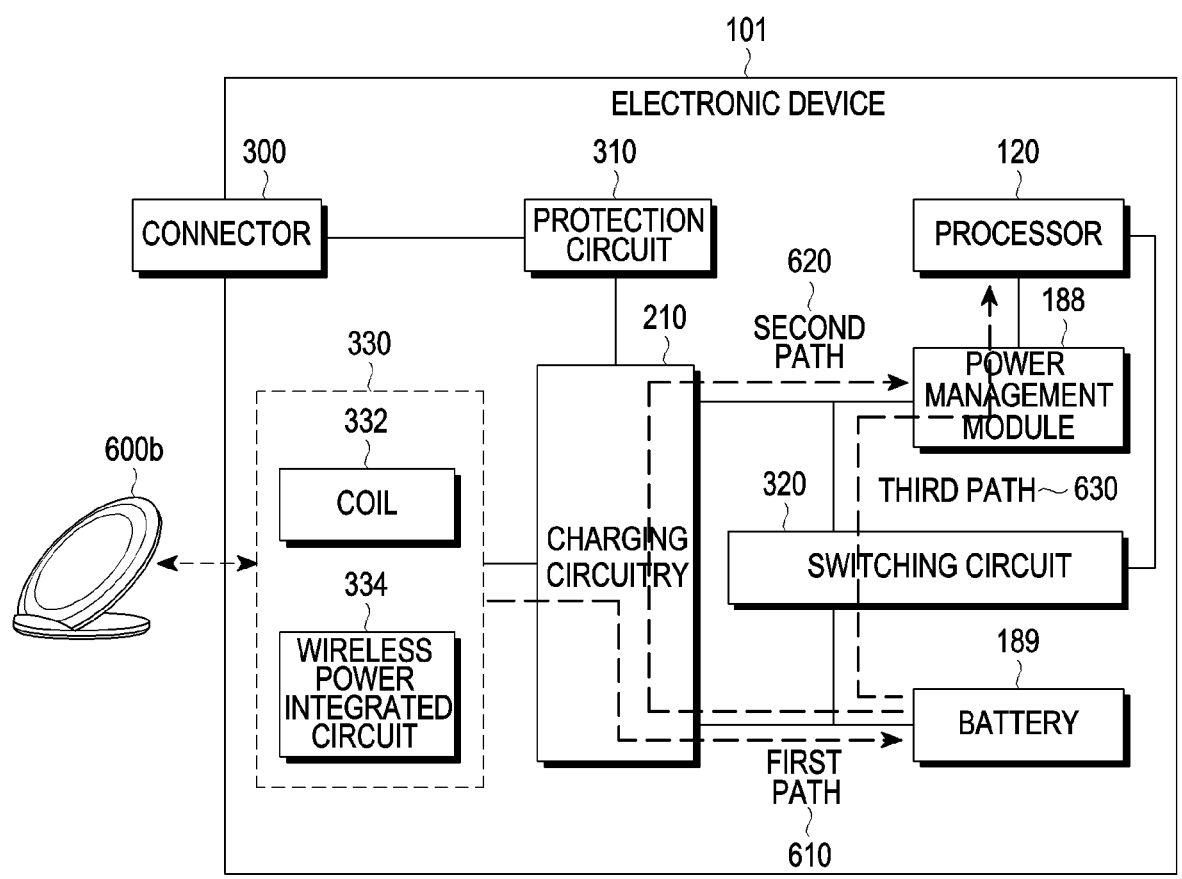

FIGS. 7A and 7B are diagrams for describing a third path 630 according to various embodiments. The third path 630 according to various embodiments of the present disclosure may mean a path through which the switching circuit 320 is shorted such that power is directly supplied to the power management module 188 or the processor 120 without passing through the charging circuitry 210.

Referring to FIGS. 7A and 7B, the third path 630 according to various embodiments of the present disclosure may include a path for connecting at least some of the connector 189, the switching circuit 320, the power management module 188, or the processor 120.

Figure 8:
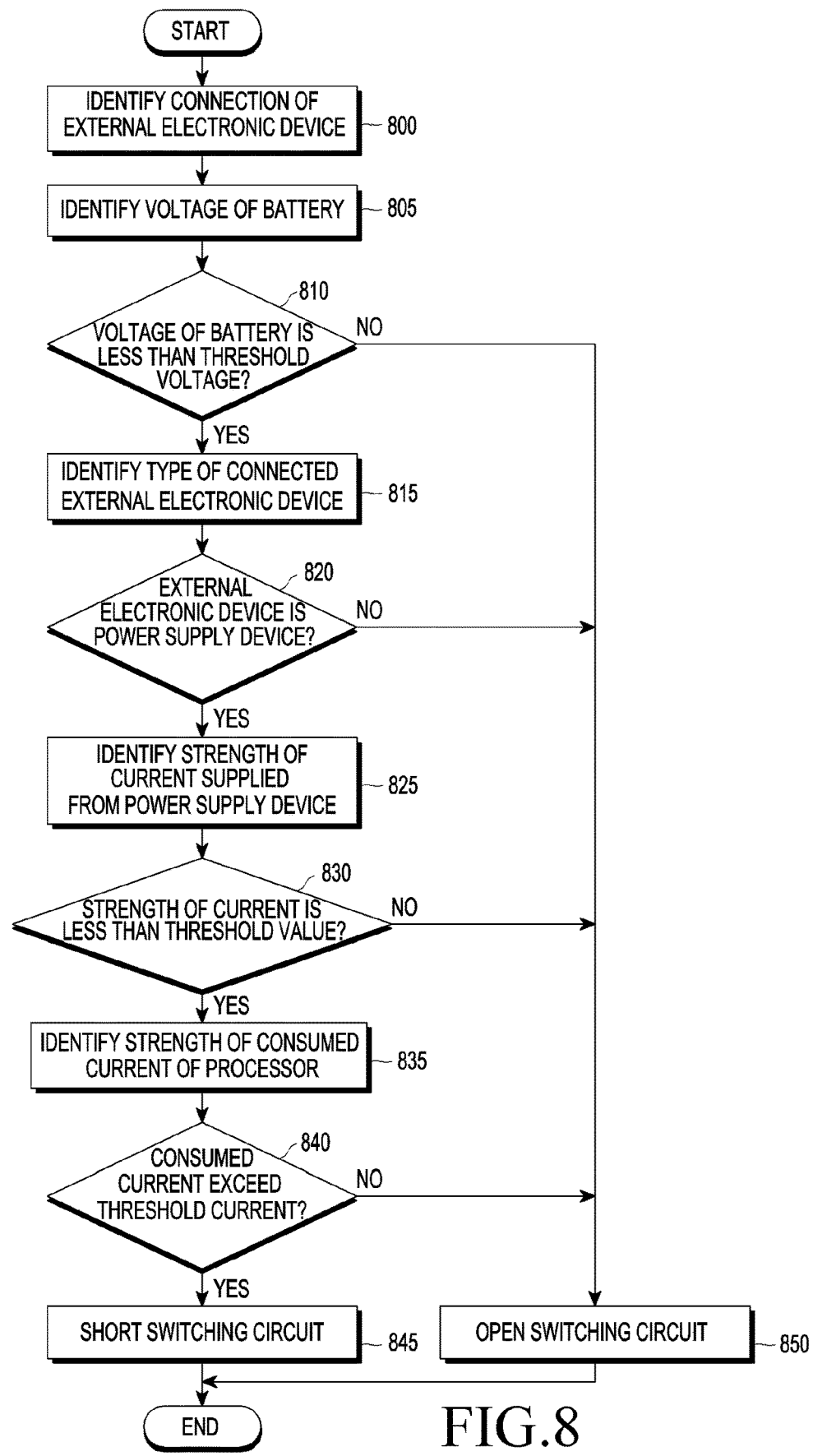
FIGS. 8 and 9 are diagrams for describing an operating method of an electronic device, according to various embodiments.
Figure 9:
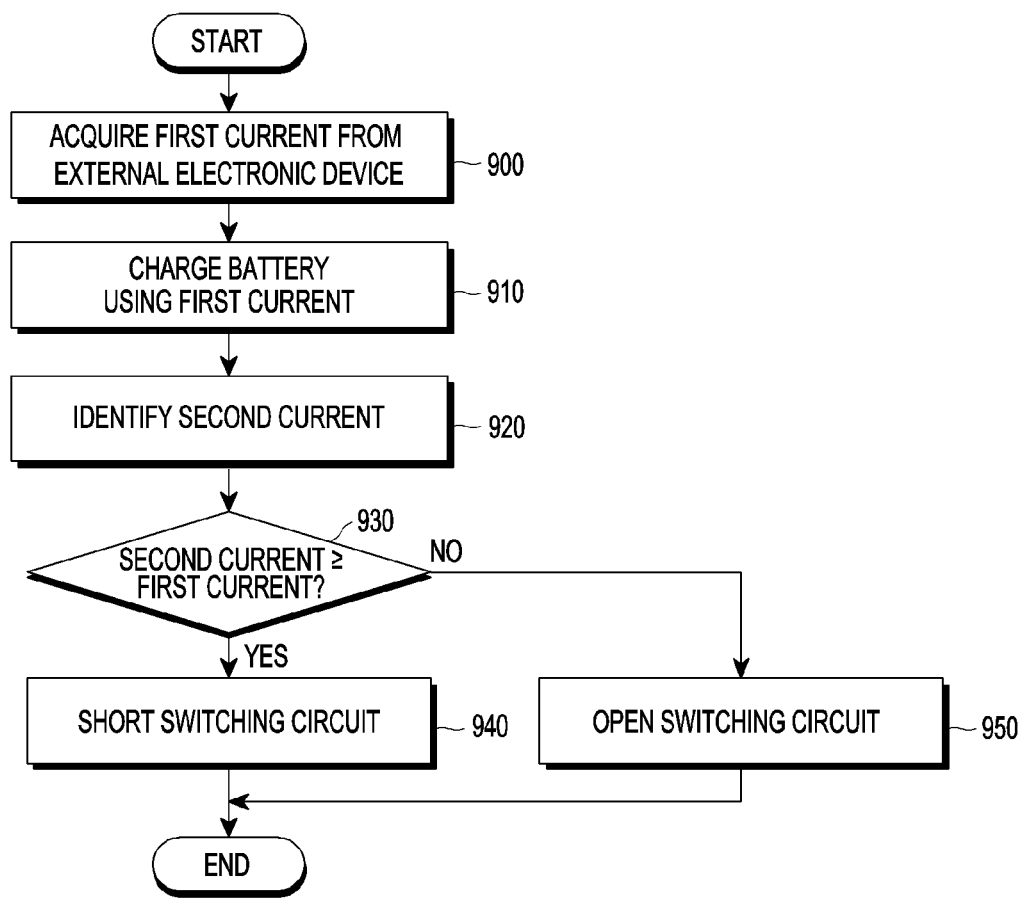

FIGS. 8 and 9 are diagrams for describing an operating method of an electronic device, according to various embodiments.

Referring to FIG. 8, in operation 800, the electronic device (e.g., the processor 120 of FIG. 1) according to various embodiments of the present disclosure may identify connection of an external electronic device. For example, through a connector (e.g., the connector 300 of FIG. 3A) according to various embodiments of the present disclosure, an external electronic device (e.g., the wired charging terminal 600a of FIG. 7A) supporting the USB 3.1 type C standards may be connected. The processor 120 according to various embodiments of the present disclosure may identify connection of the external electronic device to an electronic device (e.g., the electronic device 101 of FIG. 1) at least based on a signal Vbus transmitted from the external electronic device. However, a description related to the USB 3.1 type C standards is an example, and various embodiments of the present disclosure are not limited thereby.

The electronic device (e.g., the processor 120 of FIG. 1) according to various embodiments of the present disclosure may identify a voltage of a battery (e.g., the battery 189 of FIG. 1), in operation 805. The electronic device (e.g., the processor 120 of FIG. 1) according to various embodiments of the present disclosure may identify a voltage (or current or power) of a battery (e.g., the battery 189 of FIG. 1), in operation 805.

The electronic device (e.g., the processor 120 of FIG. 1) according to various embodiments of the present disclosure may identify whether a voltage of a battery (e.g., the battery 189 of FIG. 1) is less than a threshold voltage, in operation 810. The threshold voltage according to various embodiments of the present disclosure may be, but not limited to, about 3.45 volt (V). The electronic device (e.g., the processor 120 of FIG. 1) according to various embodiments of the present disclosure may identify that the electronic device (e.g., the electronic device 101 of FIG. 1) is in a low-voltage state when the voltage of the battery (e.g., the battery 189 of FIG. 1) is less than the threshold voltage. The electronic device (e.g., the processor 120 of FIG. 1) according to various embodiments of the present disclosure may identify a voltage in a specific position (or node) of the electronic device (e.g., the electronic device 101 of FIG. 1) to determine whether the electronic device (e.g., the electronic device 101 of FIG. 1) is in the low-voltage state.

The electronic device (e.g., the processor 120 of FIG. 1) according to various embodiments of the present disclosure may identify a type (or kind) of the connected external electronic device in operation 815, when the voltage of the battery (e.g., the battery 189 of FIG. 1) is less than the threshold voltage (YES in operation 810). According to various embodiments of the present disclosure, the electronic device (e.g., the processor 120 of FIG. 1) may identify the type of the external electronic device based on a channel configuration (CC) signal or a sideband use (SBU) signal, transmitted from the external electronic device, when the external electronic device supporting the USB 3.1 type C standards is connected. According to various embodiments of the present disclosure, the electronic device (e.g., the processor 120 of FIG. 1) may identify an identification (ID) of the external electronic device, included in the CC signal or the SBU signal, to identify whether the external electronic device is, for example, a travel adapter (TA), a vehicle, an accessory, a current detection device, etc. According to various embodiments of the present disclosure, when an external electronic device supporting legacy standards (e.g., the USB 2.0 standards) is connected, the electronic device (e.g., the processor 120 of FIG. 1) may identify a magnitude (e.g., about 50 kΩ) of a resistance based on connection of the external electronic device to identify the type of the external electronic device connected to the electronic device 101. According to various embodiments of the present disclosure, the electronic device (e.g., the processor 120 of FIG. 1) may identify the type of the external electronic device based on a signal (e.g., a high-level signal), transmitted from the wireless power reception circuit 330, indicating that wireless power is supplied from a wireless power transmitter (e.g., the wireless power supply device 600b of FIG. 6B).

The electronic device (e.g., the processor 120 of FIG. 1) according to various embodiments of the present disclosure may control the switching circuit (e.g., the switching circuit 320 of FIG. 2A) to be opened in operation 850, when the voltage of the battery (e.g., the battery 189 of FIG. 1) is greater than or equal to the threshold voltage (No in operation 810).

The electronic device (e.g., the processor 120 of FIG. 1) according to various embodiments of the present disclosure may identify whether the external electronic device is a power supply device (e.g., a vehicle) capable of supplying power (or current) to the electronic device (e.g., the electronic device 101 of FIG. 1), in operation 820.

The electronic device (e.g., the processor 120 of FIG. 1) according to various embodiments of the present disclosure may identify a strength of current supplied from the power supply device in operation 825, when the external electronic device is the power supply device capable of supplying power (or current) to the electronic device (e.g., the electronic device 101 of FIG. 1) (YES in operation 820). According to various embodiments of the present disclosure, operation 825 includes identifying a magnitude of power supplied from the power supply device and may be performed alternatively/interchangeably.

The electronic device (e.g., the processor 120 of FIG. 1) according to various embodiments of the present disclosure may control the switching circuit (e.g., the switching circuit 320 of FIG. 2A) to be opened in operation 850, when the external electronic device is not the power supply device capable of supplying power (or current) to the electronic device (e.g., the electronic device 101 of FIG. 1) (NO in operation 820).

The electronic device (e.g., the processor 120 of FIG. 1) according to various embodiments of the present disclosure may identify whether the strength of current supplied from the power supply device is less than a threshold current (e.g., about 1A (ampere)), in operation 830. The electronic device (e.g., the processor 120 of FIG. 1) according to various embodiments of the present disclosure may identify that the external electronic device connected to the electronic device (e.g., the electronic device 101 of FIG. 1) is a low-current charging device, when the strength of the current supplied from the external electronic device is less than the threshold current (e.g., about 1A).

The electronic device (e.g., the processor 120 of FIG. 1) according to various embodiments of the present disclosure may identify a strength of consumed current of the electronic device (e.g., the processor 120 of FIG. 1) in operation 835, when the strength of the current supplied from the external electronic device is less than the threshold current (e.g., about 1A) (YES in operation 830).

The electronic device (e.g., the processor 120 of FIG. 1) according to various embodiments of the present disclosure may control the switching circuit (e.g., the switching circuit 320 of FIG. 2A) to be opened in operation 850, when the strength of current supplied from the external electronic device is greater than or equal to the threshold current (e.g., about 1A) (NO in operation 830).

The electronic device (e.g., the processor 120 of FIG. 1) according to various embodiments of the present disclosure may identify whether the identified strength of the consumed current exceeds the threshold current (e.g., about 1A), in operation 840.

The electronic device (e.g., the processor 120 of FIG. 1) according to various embodiments of the present disclosure may control the switching circuit (e.g., the switching circuit 320 of FIG. 2A) to be shorted in operation 845, when the identified strength of the consumed current exceeds the threshold current (e.g., about 1A) (YES in operation 840). According to various embodiments of the present disclosure, the processor (e.g., the processor 120 of FIG. 1) may be supplied with power from the battery (e.g., the battery 189 of FIG. 1) through two paths (e.g., a second path (e.g., the second path 620 of FIG. 6A) and a third path (e.g., the third path 630 of FIG. 7A)) due to shorting of the switching circuit (e.g., the switching circuit 320 of FIG. 2A). The processor (e.g., the processor 120 of FIG. 1) according to various embodiments of the present disclosure may identify the amount of power (or the amount of current) transmitted through each path, depending on a system state of the electronic device (e.g., a consumed power volume or a consumed current volume of the processor 120 of FIG. 1). For example, when a current consumed power volume exceeds a designated rate (e.g., an about 50%) from a threshold power volume, the processor (e.g., the processor 120 of FIG. 1) may increase a power volume supplied to the processor (e.g., the processor 120 of FIG. 1) through a third path (e.g., the third path 630 of FIG. 7A) to improve the efficiency of transmission of power. According to various embodiments of the present disclosure, when a power volume of about 1 watthour (Wh) is required to drive the electronic device (e.g., the electronic device 101 of FIG. 1), the processor may control the battery (e.g., the battery 188 of FIG. 1) to output power (or current) of the same volume (e.g., about 0.5 Wh and about 0.5 Wh, respectively) through the first path and the second path.

The electronic device (e.g., the processor 120 of FIG. 1) according to various embodiments of the present disclosure may control the switching circuit (e.g., the switching circuit 320 of FIG. 2A) to be opened in operation 850, when the identified strength of the consumed current is less than the threshold current (e.g., about 1A) (NO in operation 840).

In an operating method of the electronic device according to various embodiments of the present disclosure, several operation(s) may be omitted from various operations shown in FIG. 8. For example, in the operating method of the electronic device according to various embodiments of the present disclosure, operation 845 and/or operation 850 may be performed based on an operation of identifying a voltage of a battery and an operation of identifying a strength of current supplied from an external electronic device. For example, based on the operation of identifying the voltage of the battery, operation 845 and/or operation 850 may be performed. An operation order of the operating method of the electronic device according to various embodiments of the present disclosure, shown in FIG. 8, may be changed. According to various embodiments of the present disclosure, "current" or "voltage" mentioned in FIG. 8 may be used alternatively/interchangeably with any one of "current", "voltage", and "power". According to various embodiments of the present disclosure, the term "exceed" mentioned in FIG. 8 may be used alternatively/interchangeably with the term "greater than or equal to (e.g., equal to or greater than a particular value)" (including the opposite) and the term "less than" may be used alternatively/interchangeably with the term "less than or equal to (e.g., equal to or less than a specific value)" (including the opposite).

Referring to FIG. 9, the electronic device (e.g., the processor 120 of FIG. 1) according to various embodiments of the present disclosure may acquire a first current from the outside of the electronic device (e.g., the electronic device 101 of FIG. 1), in operation 900. The first current according to various embodiments of the present disclosure may mean current for charging a battery (e.g., the battery 189 of FIG. 1) of the electronic device (e.g., the electronic device 101 of FIG. 1).

The electronic device (e.g., the processor 120 of FIG. 1) according to various embodiments of the present disclosure may charge the battery (e.g., the battery 189 of FIG. 1) by using the first current, in operation 910.

The electronic device (e.g., the processor 120 of FIG. 1) according to various embodiments of the present disclosure may identify the second current in operation 920. The second current according to various embodiments of the present disclosure may mean the amount of current applied to the electronic device (e.g., the processor 120 of FIG. 1) at present (e.g., after the elapse of a designated time from start of acquisition of the first current). According to various embodiments of the present disclosure, the second current may be mentioned as the term "system current".

The electronic device (e.g., the processor 120 of FIG. 1) according to various embodiments of the present disclosure may compare the magnitude of the first current with the magnitude of the second current, in operation 930. The electronic device (e.g., the processor 120 of FIG. 1) according to various embodiments of the present disclosure may identify whether the magnitude of the second current is greater than or equal to the magnitude of the first current.

The electronic device (e.g., the processor 120 of FIG. 1) according to various embodiments of the present disclosure may control the switching circuit to be shorted in operation 940, when the magnitude of the second current is greater than or equal to the magnitude of the first current (YES in operation 930). The electronic device (e.g., the processor 120 of FIG. 1) according to various embodiments of the present disclosure may acquire the power from the battery (e.g., the battery 189 of FIG. 1) through at least a part of the second path (e.g., the second path 620 of FIG. 6A) and at least a part of the third path (e.g., the third path 630 of FIG. 6B).

The electronic device (e.g., the processor 120 of FIG. 1) according to various embodiments of the present disclosure may control the switching circuit to be opened in operation 950, when the magnitude of the second current is less than the magnitude of the first current (NO in operation 930). The electronic device (e.g., the processor 120 of FIG. 1) according to various embodiments of the present disclosure may acquire power from the battery (e.g., the battery 189 of FIG. 620) through at least a part of the second path (e.g., the second path 620 of FIG. 6A), in operation 950.

In the operating method of the electronic device according to various embodiments of the present disclosure, shown in FIG. 9, at least some operation(s) shown in FIG. 8 (e.g., operations 805 and 810, etc., of FIG. 8) may be additionally performed. An operation order of the operating method of the electronic device according to various embodiments of the present disclosure, shown in FIG. 9, may be changed. While a description has been made of "current" as an example to describe various embodiments of the present disclosure, "current" or "voltage" mentioned in FIG. 8 may be used alternatively/interchangeably with any one of "current", "voltage", and "power".

Figure 10A:
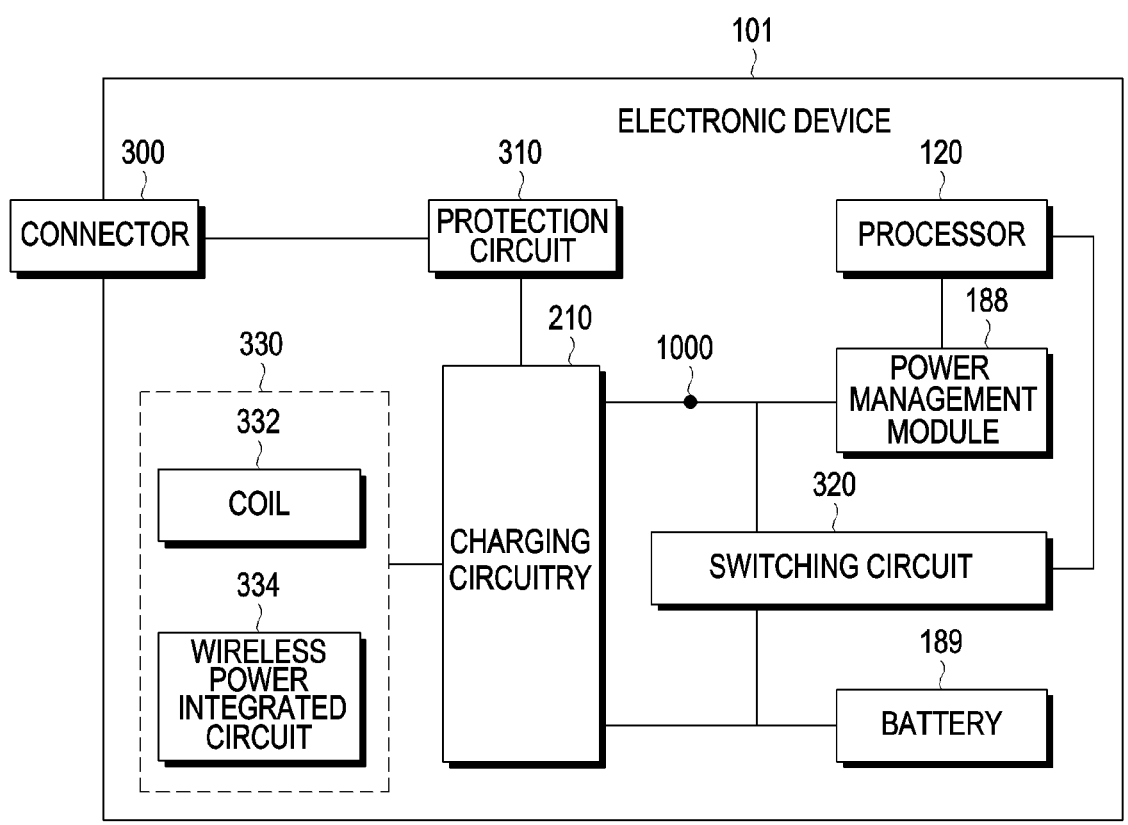
FIG. 10A is a diagram for describing a position at which a system voltage is measured according to various embodiments.

FIG. 10A is a diagram for describing a position at which a system voltage is measured according to various embodiments.

Referring to FIG. 10A, the electronic device (e.g., the processor 120 of FIG. 1) according to various embodiments of the present disclosure may measure a voltage in a particular position (e.g., a position 1000). According to various embodiments of the present disclosure, alternatively/interchangeably with an operation of identifying a battery voltage (e.g., operation 805 of FIG. 8), operations according to various embodiments of the present disclosure may be performed using the voltage measured in the position 1000. The particular position (e.g., the position 1000) according to various embodiments of the present disclosure may be any one point of the second path 620.

Figure 10B:
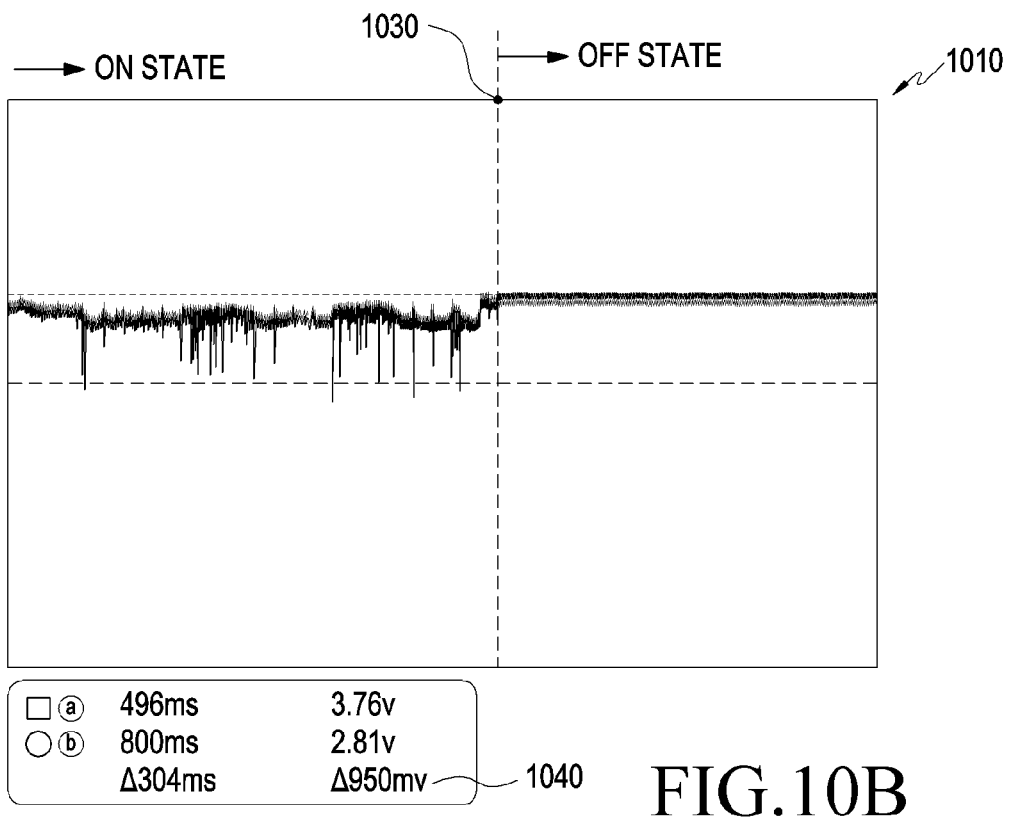
FIGS. 10B and 10C are diagrams for comparing an operation of an electronic device that does not include a switching circuit with an operation of an electronic device in which an acquisition path of power is changed by a switching circuit in a low-voltage state.
Figure 10C:
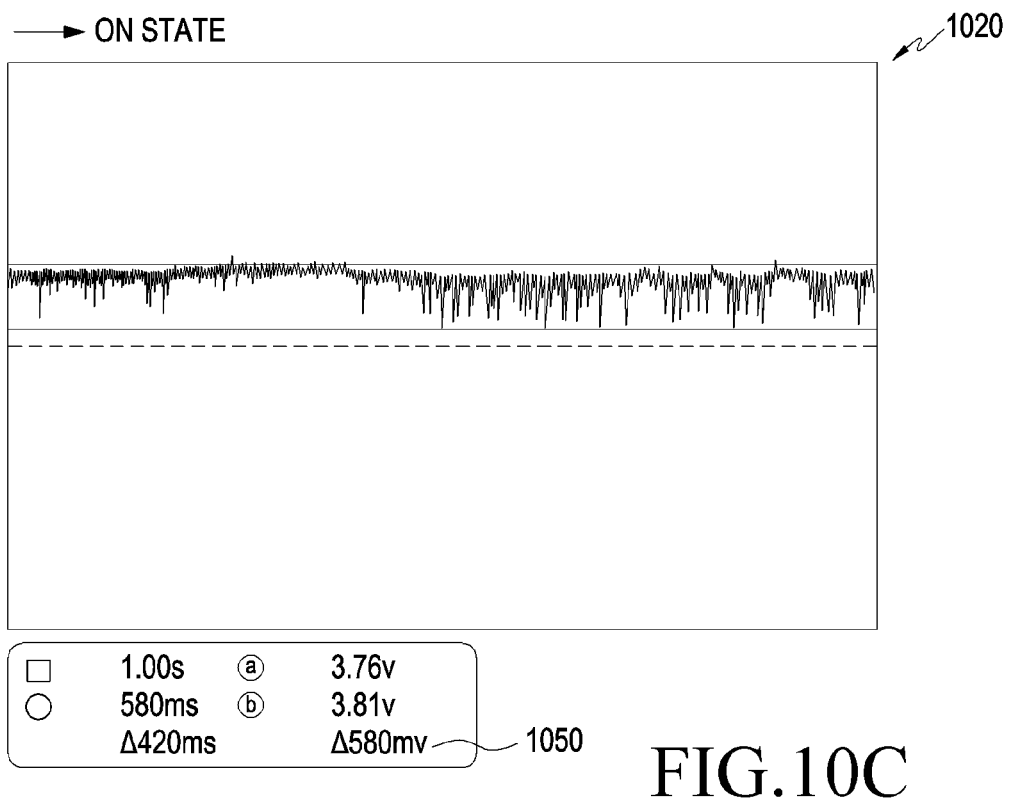

FIGS. 10B and 10C are diagrams for comparing an operation of an electronic device (e.g., shown in FIG. 10B) that does not include a switching circuit with an operation of an electronic device (e.g., shown in FIG. 10C) in which an acquisition path of power is changed (e.g., added) by a switching circuit in a low-voltage state.

FIG. 10B is a diagram 1010 showing a voltage drop quantity 1040 and a state of the electronic device (e.g., the electronic device 101 of FIG. 1) when the battery (e.g., the battery 189 of FIG. 1) of the electronic device (e.g., the electronic device 101 of FIG. 1) is in a low-voltage state, the electronic device (e.g., the electronic device 101 of FIG. 1) is charged using a low-current power supply device (e.g., charging using a USB port), and a particular application (e.g., a road guidance application) is executed during use of the electronic device (e.g., the electronic device 101 of FIG. 1). Referring to FIG. 10B, the voltage drop quantity 1040 of the electronic device (e.g., the electronic device 101 of FIG. 1) corresponding to execution of an application may be about 950 mV, and a state of the electronic device (e.g., the electronic device 101 of FIG. 1) may be maintained as an ON state until a time point 1030 elapsing by a specific time from the execution of the application. However, it may be seen that after the time point 1030 elapsing by the specific time, the state of the electronic device (e.g., the electronic device 101 of FIG. 1) is switched to an OFF state.

FIG. 10C is a diagram 1020 when the battery (e.g., the battery 189 of FIG. 1) of the electronic device (e.g., the electronic device 101 of FIG. 1) is in a low-voltage state, the electronic device (e.g., the electronic device 101 of FIG. 1) is charged using a low-current power supply device (e.g., charging using a USB port), and an additional power supply path (e.g., the third path 630 of FIG. 7A) is provided to a processor (e.g., the processor 120 of FIG. 1) through a switching circuit (e.g., the switching circuit 320 of FIG. 3A) during use of the electronic device (e.g., the electronic device 630 of FIG. 1). Referring to FIG. 10C, it may be seen that a voltage drop quantity 1050 of the electronic device (e.g., the electronic device 101 of FIG. 1) corresponding to execution of an application is about 580 mV, and the electronic device (e.g., the electronic device 101 of FIG. 1) including the switching circuit (e.g., the switching circuit 320 of FIG. 3A) shows a voltage drop quantity smaller than that of the electronic device without the switching circuit (e.g., the switching circuit 320 of FIG. 3A). Referring to FIG. 10C, it may be seen that the electronic device (e.g., the electronic device 101 of FIG. 1) including the switching circuit (e.g., the switching circuit 320 of FIG. 3A) continuously maintains the ON state in spite of execution of the application.

Figure 11A:
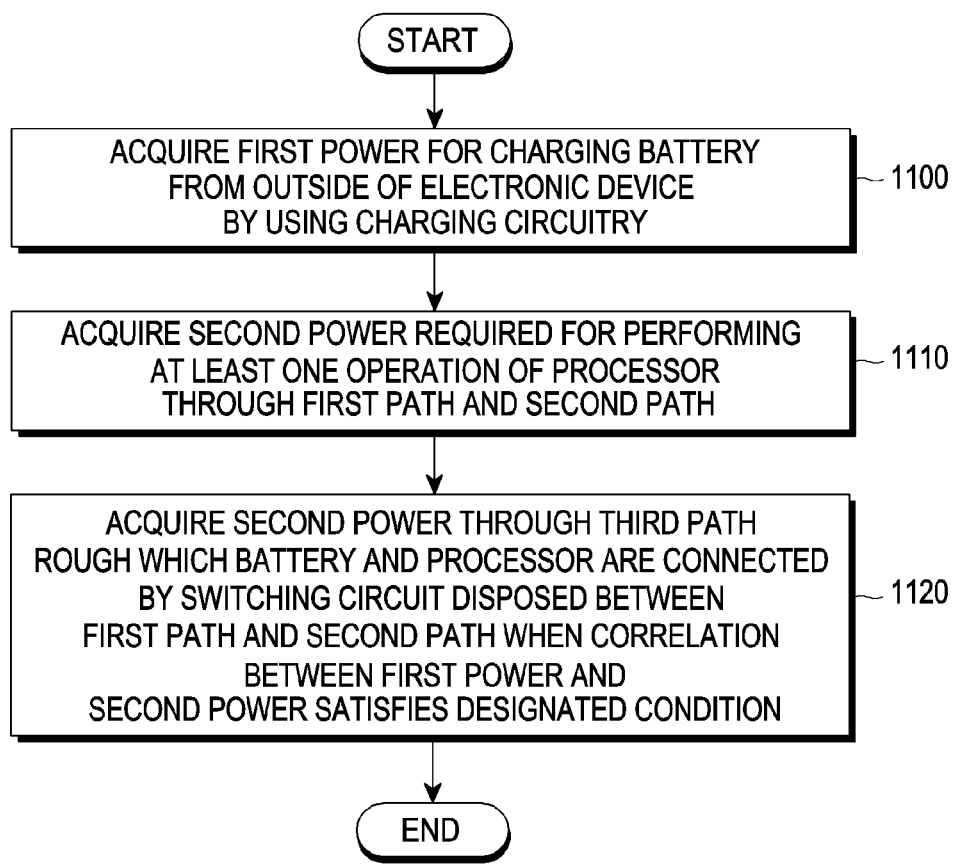
FIGS. 11A and 11B are diagrams for describing an operating method of an electronic device, according to various embodiments.
Figure 11B:
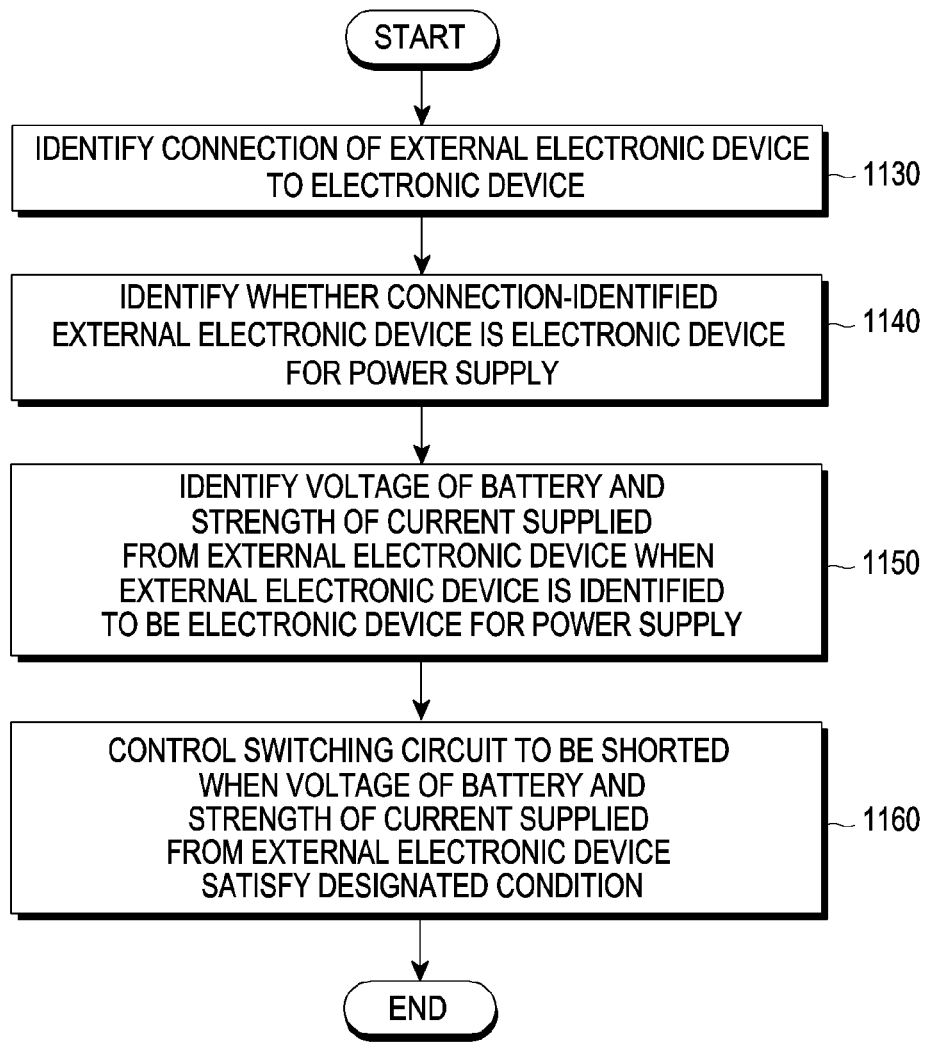

FIGS. 11A and 11B are diagrams for describing an operating method of an electronic device, according to various embodiments.

Referring to FIG. 11A, the electronic device (e.g., the processor 120 of FIG. 1) according to various embodiments of the present disclosure may acquire first power for charging a battery from the outside of the electronic device by using a charging circuitry, in operation 1100.

The electronic device (e.g., the processor 120 of FIG. 1) according to various embodiments of the present disclosure may acquire second power required for performing at least one operation of the processor through a first path and a second path, in operation 1110.

In operation 1120, the electronic device (e.g., the processor 120 of FIG. 1) according to various embodiments of the present disclosure may acquire the second power through at least a part of a third path through which the battery and the processor are connected by a switching circuit disposed between the first path and the second path, when a correlation between the first power and the second power satisfies a designated condition (e.g., a condition that the second power is greater than or equal to the first power).

Referring to FIG. 11B, in operation 1130, the electronic device (e.g., the processor 120 of FIG. 1) according to various embodiments of the present disclosure may identify connection of an external electronic device thereto.

Referring to FIG. 11B, in operation 1140, the electronic device (e.g., the processor 120 of FIG. 1) according to various embodiments of the present disclosure may identify whether the connection-identified external electronic device is an electronic device for power supply.

Referring to FIG. 11B, in operation 1150, the electronic device (e.g., the processor 120 of FIG. 1) according to various embodiments of the present disclosure may identify a voltage of the battery and a strength of current supplied from the external electronic device, when the external electronic device is identified to be the electronic device for power supply.

Referring to FIG. 11B, in operation 1160, the electronic device (e.g., the processor 120 of FIG. 1) according to various embodiments of the present disclosure may control the switching circuit to be shorted when the voltage of the battery and the strength of the current supplied from the external electronic device satisfy the designated condition.

At least some operations of various operations performed by the processor 120 described in the present disclosure may be performed by the power management module 188. The electronic device according to various embodiments of the present disclosure may be applied to a case where the battery (e.g., the battery 189 of FIG. 1) is charged using a wireless power transmitter of a pad type, which is capable of wirelessly charging various electronic devices at the same time.

An electronic device (e.g., the electronic device 101 of FIG. 1) according to various embodiments of the present disclosure may include a battery (e.g., the battery 189 of FIG. 1), a charging circuitry (e.g., the charging circuitry 210 of FIG. 2) connected to the battery through a first path (e.g., the first path 610 of FIG. 6A), and a processor (e.g., the processor 120 of FIG. 1) operatively connected to the charging circuitry through a second path (e.g., the second path 620 of FIG. 6A), in which the processor is configured to acquire first power for charging the battery from the outside of the electronic device, by using the charging circuitry, to acquire second power required for performing at least one operation of the processor through the first path and the second path, and to acquire the second power though a third path (e.g., the third path 630 of FIG. 7A) through which the battery and the processor are connected by a switching circuit (e.g., the switching circuit 320 of FIG. 3A) disposed between the first path and the second path, when a correlation between the first power and the second power satisfies a designated condition.

According to various embodiments of the present disclosure, the processor may be configured to identify connection of an external electronic device configured to supply the first power to the electronic device and to identify a voltage of the battery at least based on the connection of the external electronic device.

According to various embodiments of the present disclosure, the processor may be configured to identify whether the correlation between the first power and the second power satisfies the designated condition, when the voltage of the battery is identified as being less than a designated voltage.

According to various embodiments of the present disclosure, the processor may be configured to identify that the designated condition is satisfied, when a magnitude of the second power is equal to or greater than a magnitude of the first power.

According to various embodiments of the present disclosure, the processor may be configured to acquire the second power through the first path and the second path by opening the switching circuit, when the designated condition is not satisfied.

According to various embodiments of the present disclosure, the first power may include at least one power of power acquired at least based on a wired scheme or power acquired at least based on a wireless scheme.

According to various embodiments of the present disclosure, the electronic device may further include a power management module (e.g., the power management module 188 of FIG. 1), and the third path may include a path connecting at least some of the battery, the switching circuit, the power management module, and the processor.

A control method for an electronic device according to various embodiments of the present disclosure may include acquiring first power for charging a battery from the outside of the electronic device by using a charging circuitry, acquiring second power required to perform at least one operation of a processor through a first path and a second path, and acquiring the second power though a third path through which the battery and the processor are connected by a switching circuit disposed between the first path and the second path, when a correlation between the first power and the second power satisfies a designated condition.

According to various embodiments of the present disclosure, the control method may further include identifying whether the correlation between the first power and the second power satisfies the designated condition, in which the identification of whether the correlation between the first power and the second power satisfies the designated condition includes identifying that the designated condition is satisfied when a magnitude of the second power is equal to or greater than a magnitude of the first power.

An electronic device according to various embodiments of the present disclosure may include a battery, a power management module, a charging circuitry, a switching circuit disposed between the battery and the power management module, and a processor operatively connected to the battery, the power management module, the switching circuit, and the charging circuitry, in which the processor is configured to identify connection of an external electronic device to the electronic device, to identify whether the external electronic device, the connection of which is identified, is an electronic device for power supply, to identify a voltage of the battery and a strength of current supplied from the external electronic device, when the external electronic device is identified to be the electronic device for power supply, and to control the switching circuit to be shorted, when the voltage of the battery and the strength of the current supplied from the external electronic device satisfy a designated condition.

According to various embodiments of the present disclosure, the designated condition may include at least one of a case where the voltage of the battery is less than a designated voltage or a case where the strength of the current supplied from the external electronic device is less than a designated strength of current.

According to various embodiments of the present disclosure, the external electronic device may include at least one of a power supply device at least based on a wired scheme or a power supply device at least based on a wireless scheme.

According to various embodiments of the present disclosure, the processor may be further configured to identify a strength of current consumed by the processor, in which when the identified strength of the consumed current exceeds a designated strength of current, the processor may control the switching circuit to be shorted.

According to various embodiments of the present disclosure, the switching circuit may include a first stabilization module (e.g., the first stabilization module 410 of FIG. 4), a second stabilization module (e.g., the second stabilization module 420 of FIG. 4), and a switch module (e.g., the switch module 400 of FIG. 4) operatively connected to the first stabilization module and the second stabilization module, in which the first stabilization module may include a first capacitor (e.g., the first capacitor 501 of FIG. 5) and a second capacitor (e.g., the second capacitor 502 of FIG. 5) and the second stabilization module may include a third capacitor (e.g., the third capacitor 503 of FIG. 5), a fourth capacitor (e.g., the fourth capacitor 504 of FIG. 5), and a first resistor (e.g., the first resistor 505 of FIG. 5).

According to various embodiments of the present disclosure, a switching circuit may include a first pin (e.g., the first pin 401 of FIG. 5), a second pin (e.g., the second pin 402 of FIG. 5), a third pin (e.g., the third pin 403 of FIG. 5), a fourth pin (e.g., the fourth pin 404 of FIG. 5), and a fifth pin (e.g., the fifth pin 405 of FIG. 5), in which the first pin may be connected to the power management module and the first stabilization module, the second pin may be connected to the battery, the third pin may be connected to the processor and the second stabilization module, and the fourth and the fifth pin may be grounded.

An electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
    a battery;
    a charging circuitry connected to the battery through a first path; and
    a processor operatively connected to the charging circuitry through a second path,
    wherein the processor is configured to:
        acquire first power for charging the battery from an external device, by using the charging circuitry;
        acquire second power required for performing at least one operation of the processor through the first path and the second path; and
        acquire the second power though a third path through which the battery and the processor are connected by a switching circuit disposed between the first path and the second path, when a correlation between the first power and the second power satisfies a designated condition.

2. The electronic device of claim 1, wherein the processor is configured to:
    identify connection of an external electronic device configured to supply the first power to the electronic device; and
    identify a voltage of the battery at least based on the connection of the external electronic device.

3. The electronic device of claim 2, wherein the processor is configured to identify whether the correlation between the first power and the second power satisfies the designated condition, when the voltage of the battery is identified as being less than a designated voltage.

4. The electronic device of claim 1, wherein the processor is configured to identify that the designated condition is satisfied, when a magnitude of the second power is equal to or greater than a magnitude of the first power.

5. The electronic device of claim 1, wherein the processor is configured to acquire the second power through the first path and the second path by opening the switching circuit, when the designated condition is not satisfied.

6. The electronic device of claim 1, wherein the first power comprises at least one power of power acquired at least based on a wired scheme or power acquired at least based on a wireless scheme.

7. The electronic device of claim 1, further comprising a power management module,
    wherein the third path comprises a path connecting at least some of the battery, the switching circuit, the power management module, and the processor.

8. A control method for an electronic device, the control method comprising:
    acquiring first power for charging a battery from an external device by using a charging circuitry;
    acquiring second power required to perform at least one operation of a processor through a first path and a second path; and
    acquiring the second power though a third path through which the battery and the processor are connected by a switching circuit disposed between the first path and the second path, when a correlation between the first power and the second power satisfies a designated condition.

9. The control method of claim 8, further comprising:
    identifying connection of an external electronic device configured to supply the first power to the electronic device; and
    identifying a voltage of the battery at least based on the connection of the external electronic device.

10. The control method of claim 9, further comprising identifying whether the correlation between the first power and the second power satisfies the designated condition, when the voltage of the battery is identified as being less than a designated voltage.

11. The control method of claim 8, further comprising identifying whether the correlation between the first power and the second power satisfies the designated condition,
    wherein the identification of whether the correlation between the first power and the second power satisfies the designated condition comprises identifying that the designated condition is satisfied when a magnitude of the second power is equal to or greater than a magnitude of the first power.

12. The control method of claim 8, further comprising acquiring the second power through the first path and the second path by opening the switching circuit, when the designated condition is not satisfied.

13. The control method of claim 8, wherein the first power comprises at least one power of power acquired at least based on a wired scheme or power acquired at least based on a wireless scheme.

14. The control method of claim 8, wherein the electronic device further comprises a power management module, and
    the third path comprises a path connecting at least some of the battery, the switching circuit, the power management module, and the processor.

* * * * *